(12) United States Patent
Larsson et al.

(10) Patent No.: US 12,685,949 B2
(45) Date of Patent: Jul. 21, 2026

(54) FILTER UNIT LIFTING SYSTEM

(71) Applicant: VEOLIA WATER SOLUTIONS & TECHNOLOGIES SUPPORT, Saint-Maurice Cedex (FR)

(72) Inventors: Per Larsson, Trelleborg (SE); Kjell Svensson, Limhamn (SE)

(73) Assignee: VEOLIA WATER SOLUTIONS & TECHNOLOGIES SUPPORT, Saint-Maurice Cedex (FR)

( * ) Notice: Subject to any disclaimer, the term of this patent is extended or adjusted under 35 U.S.C. 154(b) by 459 days.

(21) Appl. No.: 18/263,454

(22) PCT Filed: Jan. 27, 2022

(86) PCT No.: PCT/SE2022/050087
§ 371 (c)(1),
(2) Date: Jul. 28, 2023

(87) PCT Pub. No.: WO2022/164373
PCT Pub. Date: Aug. 4, 2022

(65) Prior Publication Data
US 2024/0082757 A1 Mar. 14, 2024

(30) Foreign Application Priority Data

Feb. 1, 2021 (SE) ................................... 2150112-7

(51) Int. Cl.
*B01D 33/80* (2006.01)
*B01D 33/06* (2006.01)
*B01D 33/21* (2006.01)

(52) U.S. Cl.
CPC ........... *B01D 33/803* (2013.01); *B01D 33/06* (2013.01); *B01D 33/21* (2013.01); *B01D 2201/24* (2013.01)

(58) Field of Classification Search
CPC ...... B01D 33/803; B01D 33/06; B01D 33/21; B01D 2201/24; B01D 29/13; B01D 35/30; B01D 29/96
(Continued)

(56) References Cited

U.S. PATENT DOCUMENTS 5,141,650 A * 8/1992 Cavo .................... B01D 29/606
210/162
2016/0256832 A1 9/2016 Okajima et al.
(Continued)

FOREIGN PATENT DOCUMENTS

CN 202893056 U 4/2013
CN 105031998 A 11/2015
(Continued)

OTHER PUBLICATIONS

International Search Report and Written Opinion for corresponding Application No. PCT/SE2022/050087, issued on Mar. 15, 2022.
(Continued)

*Primary Examiner* — Madeline Gonzalez
(74) *Attorney, Agent, or Firm* — Renner, Otto, Boisselle & Sklar, LLP

(57) ABSTRACT

The invention pertains to a water filter unit with an integrated lifting system, comprising a water filter, at least two lifting pillars, at least two sleeves and a slide connector, wherein the sleeves are attached at the corners of the water filter, the length axis of the sleeves being perpendicular to the mounting surface of the water filter, the lifting pillars are arranged to fit inside the sleeves, wherein the length axis of the lifting pillars coincide with the length axis of the sleeves, such that the sleeves may slide along the lifting pillars, thereby forming at least two lifting pillar and sleeve pairs, wherein the at least two pairs are connected to at least one lifting aid for lifting the water filter unit from an operative
(Continued)

position to a raised position, and the slide connector comprises a filter side connector connected to the water filter unit arranged for connection to an external source thereby forming a fluid connection between the water filter unit and the external source when the water filter unit is lowered into the operative position. Furthermore, the invention discloses a lifting system for a water filter unit.

32 Claims, 5 Drawing Sheets

(58) Field of Classification Search
USPC ....... 210/232, 241, 295, 237, 171, 205, 212, 210/230, 236, 244, 249, 250, 251, 259, 210/455, 473, 477, 224, 330, 402, 486
See application file for complete search history.

(56) References Cited

U.S. PATENT DOCUMENTS

| | | |
|---|---|---|
| 2017/0284077 A1 | 10/2017 | Deurloo |
| 2019/0119077 A1 | 4/2019 | Okajima et al. |

FOREIGN PATENT DOCUMENTS

| | | |
|---|---|---|
| CN | 107349654 A | 11/2017 |
| CN | 207641108 U | 7/2018 |
| CN | 111804034 A | 10/2020 |
| EP | 1044049 A1 | 10/2000 |
| EP | 1961475 A1 | 8/2008 |
| EP | 1961475 B1 | 6/2020 |
| JP | H07-080215 A | 3/1995 |
| JP | 2003071554 A | 3/2003 |
| JP | 2011115673 A | 6/2011 |
| JP | 2011255305 A | 12/2011 |
| JP | 2014188441 A | 10/2014 |
| JP | 2018522716 A | 8/2018 |
| KR | 102208611 B1 | 1/2021 |
| WO | 99/30797 A1 | 6/1999 |

OTHER PUBLICATIONS

Swedish Search Report for corresponding Application No. SE 2150112-7, issued on Oct. 5, 2021.

* cited by examiner

300

303

304

302

301

(A)

(B)

400

401

402

403

404

400

401

404

FILTER UNIT LIFTING SYSTEM

This application is a national phase of International Application No. PCT/SE2022/050087 filed Jan. 27, 2022, which claims priority to Swedish Application No. 2150112-7 filed Feb. 1, 2021, each of which is hereby incorporated herein by reference in its entirety.

TECHNICAL FIELD

This invention pertains in general to the field of water treatment. More particularly, the invention pertains to water treatment filters, such as submerged water filters for aquacultures. Furthermore, the present invention pertains to a water filter unit with a lifting system, or a lifting system that can be integrated with a filter unit, lifting up a submerged filter unit for service.

BACKGROUND

In certain water applications, such as aquaculture (fish ponds), water purification systems, such as filter units, are used to maintain and control the water quality. Such filter units may for instance be rotary filter units, as described in EP1044049A1, or drum filters. It is common in aquaculture applications that multiple filter units are placed in one large basin that can't be drained as long as there are fish in the system. As such, the possibilities to perform service and maintenance on such filter units are limited.

To date, maintenance and parts replacement of such filter units (installed in basins that cannot be drained) have to take place below the water surface and is carried out by divers. This has led to the development of devices that facilitate such on location maintenance, such as cleaning of the filter cloth, as described in EP1961475A1. However, more extensive service and parts replacement is still a big undertaking when the device is installed under water.

Alternatively, overhead cranes, large enough to lift an entire filter unit, can be used to remove the filter from its installed location to allow for maintenance. However, installation of such cranes is both expensive and may not even be possible in all aquaculture environments. Furthermore, this requires that the unit is de-installed before it is removed, and requires an underwater installation procedure (by divers) of the filter unit before it can be put back into operation again.

As such, there is a need for novel approaches for allowing easier access to water filter units for performing service and maintenance.

SUMMARY

Accordingly, the present invention preferably seeks to mitigate, alleviate or eliminate one or more of the above-identified deficiencies in the art and disadvantages singly or in any combination.

According to a first aspect, this is achieved by a water filter unit with an integrated lifting system, comprising a water filter unit, at least two lifting pillars, at least two sleeves and a slide connector, wherein the sleeves are attached at the corners of the water filter, the length axis of the sleeves being perpendicular to the mounting surface of the filter, the lifting pillars are arranged to fit inside the sleeves, wherein the length axis of the lifting pillars coincide with the length axis of the sleeves, such that the sleeves may slide along the lifting pillars, thereby forming at least two lifting pillar and sleeve pairs, wherein the at least two pairs are connected to at least one lifting aid for lifting the water filter unit from an operative position to a raised position, and the slide connector comprises a filter side connector connected to the filter unit arranged for connection to an external source or outlet thereby forming a fluid connection between the filter unit and the external source or outlet when the filter unit is lowered into the operative position.

According to a second aspect, a lifting system for a water filter unit is provided, comprising at least two lifting pillars, at least two sleeves and a slide connector, wherein the sleeves comprises at least two filter unit connectors for attaching the sleeves to the corners of a water filter, the length axis of the sleeves being perpendicular the mounting surface of the filter, and the lifting pillars are arranged to fit inside the sleeves, wherein the length axis of the lifting pillars coincide with the length axis of the sleeves, such that the sleeves may slide along the lifting pillars, thereby forming at least two lifting pillar and sleeve pairs, wherein the at least two pairs are connected to at least one lifting aid, whereby the lifting system may lift a water filter unit from an operative position to a raised position, and the slide connector comprises a filter side connector connected to a filter unit arranged for connection to an external source or outlet thereby forming a fluid connection between the filter unit and the external source or outlet when the filter unit is lowered into the operative position.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
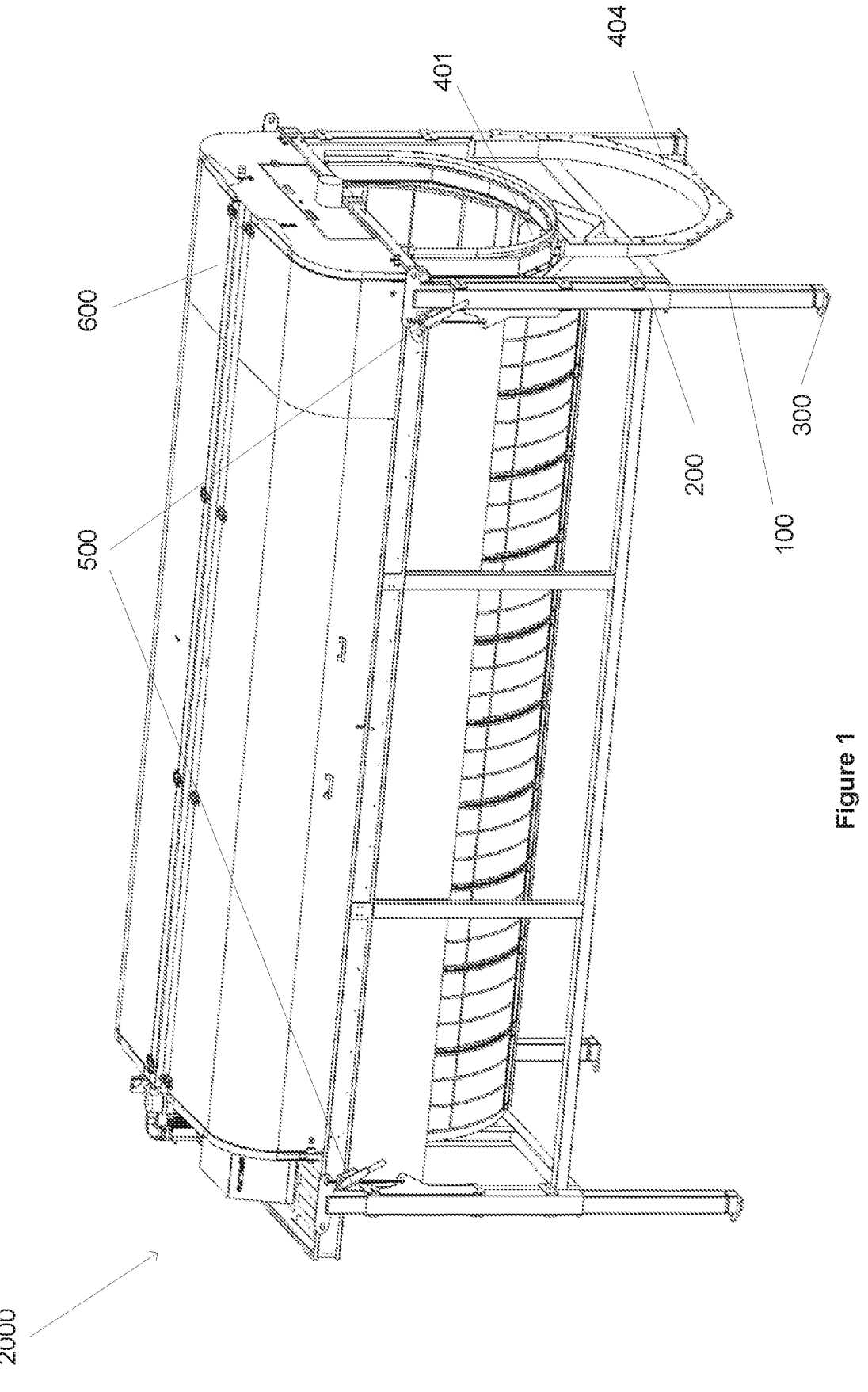
FIG. 1 is a schematic drawing of a water filter unit integrated with a lifting system in a raised position.

Embodiments of the invention will be described with reference to FIGS. 1-8, which illustrate schematically an example arrangement to some embodiments. The same reference signs are used for corresponding features in different figures. The terminology used in the detailed description and drawings of the embodiments is not intended to be limiting.

The following description focuses on embodiments of the present invention applicable to a filter unit 2000 integrated with a lifting system 1000 and a lifting system 1000 for a filter unit 2000.

The filer unit is typically a part of a water purification process where larger (rotary) filters are used, such as, but not limited to, in waste water plants, municipal water works, industrial waste water purification processes, aquacultures or for clear water purification. The filter unit with the lifting system may be arranged for operation in a fish pond or large basin that can't be drained as long as there are fish in the system. The invention pertains to a system which helps to solve the problems in the art with regards to getting access to the system, such for maintenance and parts replacement of filter units.

In one embodiment, a water filter unit 2000 with an integrated lifting system 1000 comprises a water filter 600, at least two lifting poles or pillars 100, at least two sleeves 200 and a slide connector 400. The sleeves are attached at the corners of the water filter 600, the length axis of the sleeves 200 being perpendicular to the mounting surface of the filter 600, that is the sleeves are mounted vertically. The lifting pillars 100 are arranged to fit inside the sleeves 200, wherein the length axis of the lifting pillars 100 coincide with the length axis of the sleeves 200, such that the sleeves 200 may slide along the lifting pillars 100, thus forming at least two lifting pillar 100 and sleeve 200 pairs. The at least two pairs are connected to at least one lifting aid 500 for lifting the water filter unit 2000 from an operative position to a raised position. The slide connector 400 may comprise a filter side connector 401 connected to the filter unit 2000 arranged for connection to an external source, thereby forming a fluid connection between the filter unit 2000 and the external source when the filter unit 2000 is lowered into the operative position.

Figure 2:
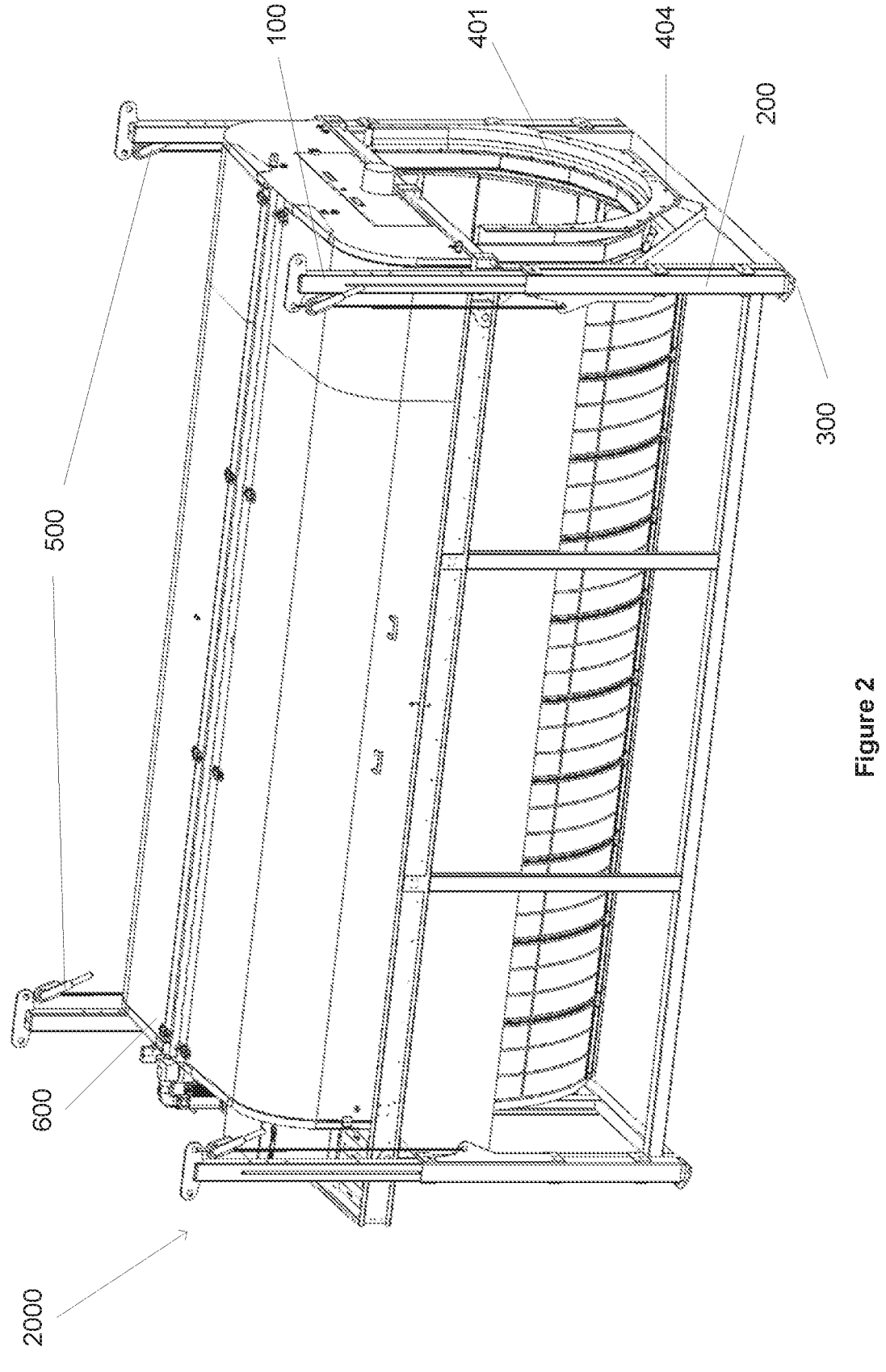
FIG. 2 is a schematic drawing of a water filter unit integrated with the lifting system in an operative position.
Figure 3:
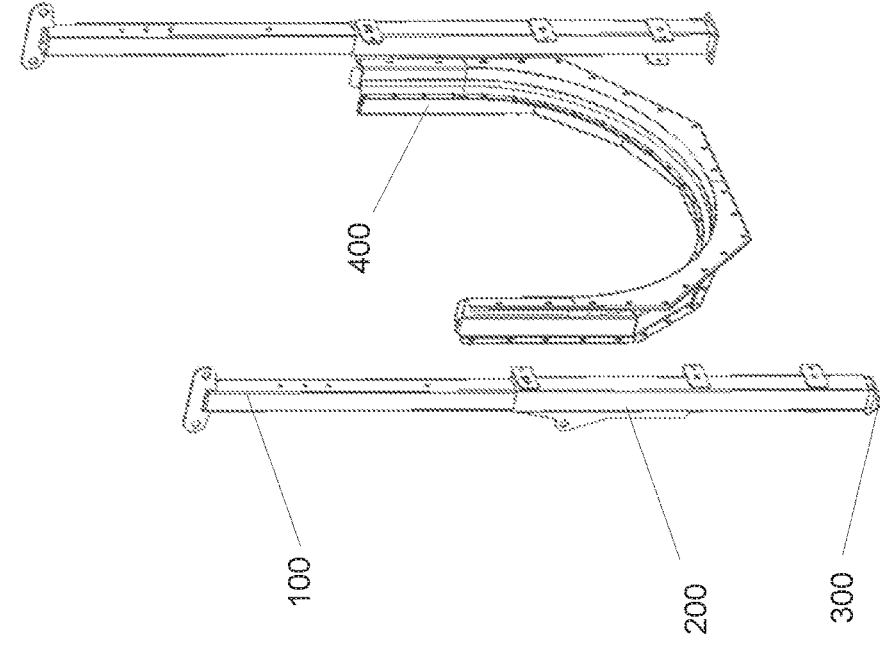
FIG. 3 is a schematic drawing of a complete lifting system 1 for a filter unit.
Figure 3:
Figure 3:
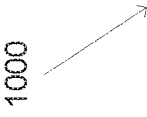
Figure 3:
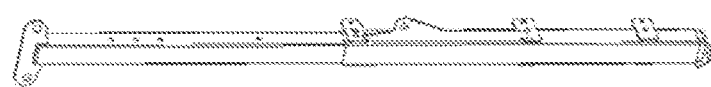

The sleeves can glide up and down along the lifting poles. When the sleeves are in the bottom position, the filter system is in its operative position (i.e. standing on the floor/bottom). When the sleeves are moved along the lifting poles towards the top position, the filter unit is lifted off the floor towards the raised (service) position. This can be seen in FIG. 1, wherein a water filter unit 2000 with an integrated lifting system 1000 is shown in a raised position. In FIG. 2, the water filter has been lowered to its operative position. In FIGS. 1 and 2, the filter unit is a rotary filter, but it may also be other filter types, such as a drum filter in other embodiments.

Previously, such lifting has involved use of an overhead crane, large enough to lift the entire filter unit, which has required both space to enable access for the crane, and possibly, a strong enough building or mount, for attaching such a crane above the filter unit. In the invention, the filter unit may be lifted straight up from its installation position, to a position above the water surface, to facilitate easy service and replacement of parts.

The lifting may be facilitated in several ways, such as by, but not limited to, using a winch, a hoist, a rack and pinion, lead screw, or a pneumatic or hydraulic cylinder as a lifting aid. As such, the lifting may be operated manually, electrically, pneumatically or hydraulically.

In one embodiment, the lifting device may be external, such as a crane attached to the filter system and a lifting point above the filter system. In such a case, the sleeves attached to the filter system will still guide the lifting and ensure that the unit is lifted along one axis, and thus maintains its position over the footprint.

However, in a preferred embodiment of the invention, the lifting device is mounted on at least one, preferably at least two, or even all four, pairs of lifting pole and sleeve. Thus, no external structure above the filter (being strong enough to hold the weight of the whole unit) is required. Furthermore, by having at least two, preferably four, such lifting devices sharing the weight of the filter device, they can be scaled down considerably in size, and (for many systems) be operated manually.

In one embodiment, the lifting pillars 100 each comprises a profile tube 101, with a bottom end 102, and a top plate 103 with anchor means 104 for connection to the lifting aid 500.

In one embodiment, the sleeves 200 each comprises a hollow profile tube 201 provided with anchor means 202 for connection to said lifting aid 500.

A lifting aid, such as a hoist, may thus be attached between the sleeve and the top plate of the lifting pole, which will enable lifting of the filter unit.

In one embodiment, the anchor means 202 of the hollow profile tube 201 and the anchor means 104 of the lifting pillar 100 are connected to the lifting aid 500 on said at least two of the lifting pillar 100 and sleeve 200 pairs.

By having at least two, such as four, such lifting aids, sharing the weight of the filter device, they can be scaled down considerably in size. One such example can be seen in FIGS. 1 and 2, where the lifting system 500 comprises chain hoists, one attached to each lifting pole and sleeve pair, to facilitate easy lifting of the filter unit.

In one embodiment, the lifting pole comprises a rack (i.e. toothed bar) and the sleeves comprises a corresponding pinion (round gear). When the pinion is turned, the sleeve and thus filter unit will move along the lifting pole. This pinion may be turned manually, such by using a crank mechanism, possibly together with a gearing system, or the pinion may be turned electronically using an electric motor.

In one embodiment, a hydraulic or pneumatic cylinder is used to move the sleeve and thus filter unit along the lifting pole.

As such, using the solution of the invention, there is no need for having to have facilities capable of providing lifting points and space for a large overhead crane to access the filter units.

To be able to lift the system in a stable manner, the length of the lifting pillars 100 is at least equal to or larger than the combined length of the sleeves 200 and the lifting capacity. The lifting capacity refers to the maximum vertical distance the lifting system can lift the filter unit from the operating position. A lifting crane connected to a structure above the filter unit also leads to other drawbacks, such as the filter being lift from one lifting point. As such, commonly, the filter unit will be able to rotate around the lifting axis and swing back and forth (as a pendulum hanging from the lifting point), which may present a danger during the service.

According to this disclosure, the filter unit will move straight upwards along a lifting axis. Very little translational or rotational movement will be possible, since sleeves on the filter unit will glide along the lifting pillars 100. Also, by placing the sleeves 200 in the corners of the frame of the filter unit, the arrangement will be very stable.

Once the filter unit has been lifted up to its raised position for service and maintenance, it is beneficial if it can be locked in place.

Figures 4, 5, 6:
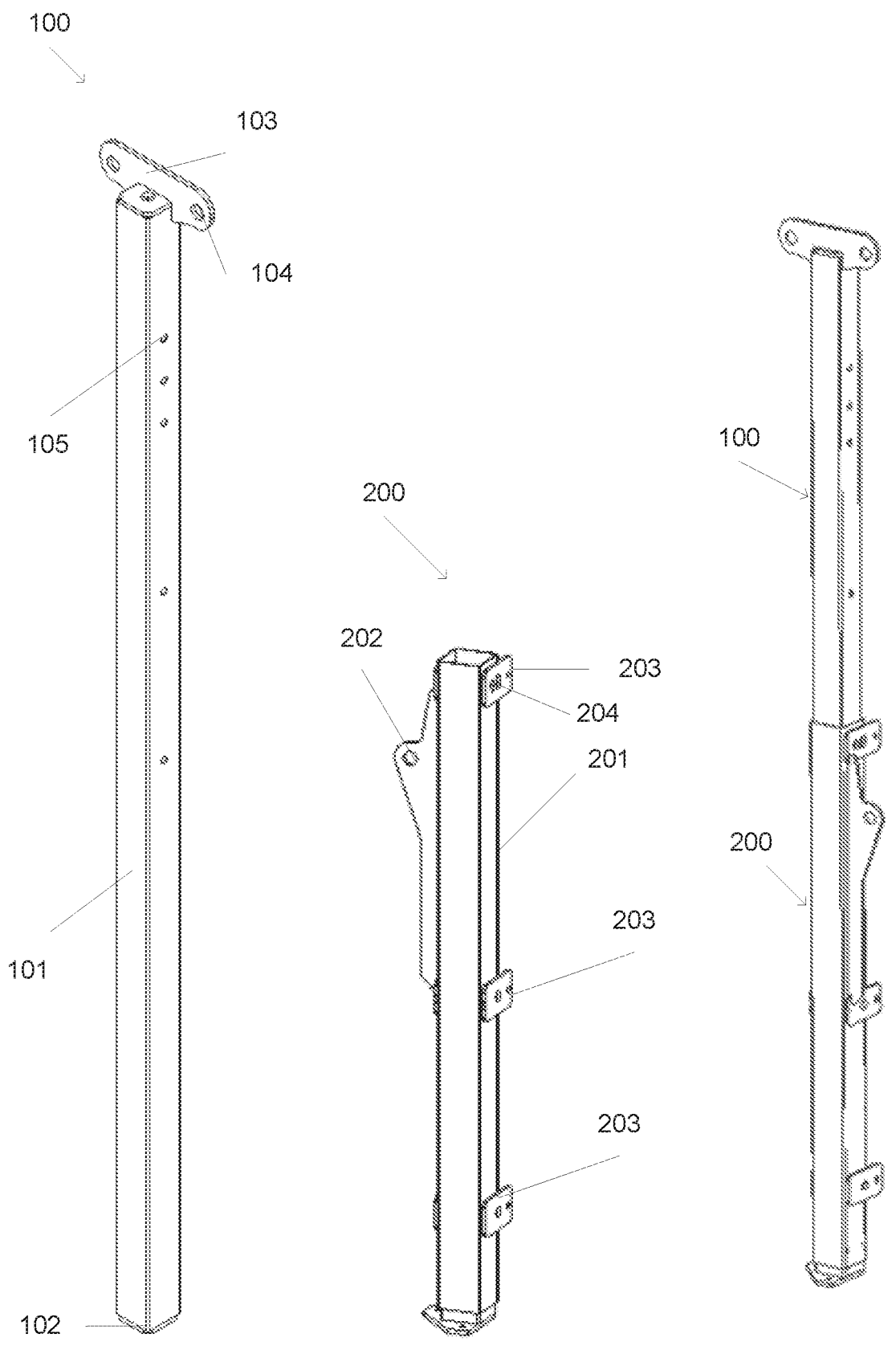
FIG. 4 is a schematic drawing of a lifting pillar.
FIG. 5 is a schematic drawing of a sleeve.
FIG. 6 is a schematic drawing of a lifting pillar and sleeve pair.

Thus, in one embodiment, the profile tube 101 of the lifting pillars 100 and the hollow profile tube 201 of the sleeves 200 may comprise locking holes 105, 204 as illustrated in FIGS. 4 and 5, wherein the locking holes 105, 204 overlap once the filter unit is in the raised position, such that locking bolts may be inserted through the locking holes to secure the sleeves 200 to the lifting pillars 100. This ensures that the filter unit is secured in the uplifted position until the locking bolts are removed. As such, many of the risks normally involved in lifting a filter unit will be avoided.

However, there are further advantages of the controlled lifting along one axis. Once the filter unit has been serviced/repaired, it will be lowered down to exactly the same position again, thus eliminating the need for a completely new installation of the filter unit. This especially important, if the installation has to take place in an operative position under water.

To ensure that the position is the same, the filter unit may comprise self-centering supports 300 attached to the floor where the filter unit is installed.

Figure 7:
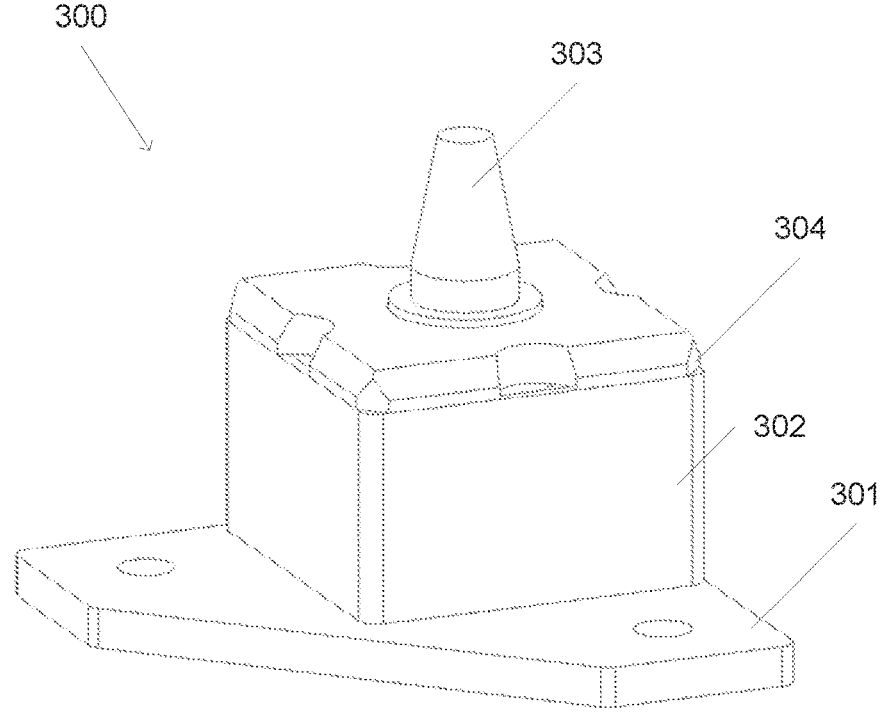
FIG. 7 is a schematic drawing of a self-centering support.

In one embodiment, a self-centering support 300 is provided for each sleeve 200. As shown in FIG. 7, the self-centering support 300 may comprise a profile tube portion 302 and a top plate 304. The profile tube portion 302 fits inside the sleeve 200, and the lifting pillar 100 rests on the top plate 304 when said lifting pillar 100 is inserted into said sleeve 200.

In one embodiment, the self-centering support 300 further comprises a base plate 301 and centering tap 303 located on the top plate. The vertical centering tap 303 fits inside the lifting pillar 100, such that the pillar 100 is centered on the self-centering support 300 when said lifting pillar 100 is inserted into said sleeve 200.

Commonly, the filter unit has additional feet, positioned to effectively carry the weight of the filter unit, and possibly to help minimize vibration during operation. In such cases, the sleeve 200 is centered by the profile tube portion 302, but does not rest on the base plate 301. The profile tube portion 302 of the self-centering support 300 has the same cross section dimension as the lifting pillars. As such, the sleeves 200 will fit over the profile tube portion 302. In turn, the base of the lifting pillar may rest on the top plate 304 of the support 300, and it will be positioned by a guide tap, i.e the vertical centering tap 303.

As such, when the filter unit is in a lowered position, i.e the operative position, the lifting pillars may be removed. When the filter unit is to be lifted, the lifting pillars are simply placed on the support, and will remain in place during the lift, due to the centering tap and weigh of the filter unit.

Normally, a filter unit is bolted to the influent wall or channel. In such a case, it must be detached from an influent wall or channel before a filter unit can be moved or lifted, which would require a de-installation procedure, sometimes carried out by divers. According to the invention, this is advantageously circumvented by means of the slide connector 400. The slide connector 400 is arranged for connection to an external source thereby forming a fluid connection between the filter unit 2000 and the external source when the filter unit 2000 is in the operative position.

In one embodiment, the slide connector 400, further comprises an external connector 404. This is mountable on the external source, such as, but not limited to, another unit, a pipe, a channel or a wall with an inlet or outlet of for example a basin or pond.

The slide connector 400 can comprise sealing means 403, such as a rubber seal, gasket or clamp, connected to the filter side connector 401 or the external connector 404. This will ensure a tight seal between the filter side connector 401 or the external connector 404, thereby minimizing potential leakage.

In one embodiment, the external connector 404 is U-shaped with the opening upwards long the vertical axis, such that the side connector 401 fits inside the external connector 404. This arrangement allows the filter side connector 401 to be lifted vertically from the external source when lifting the water filter unit 2000 from the operative position to a raised position.

Figure 8:
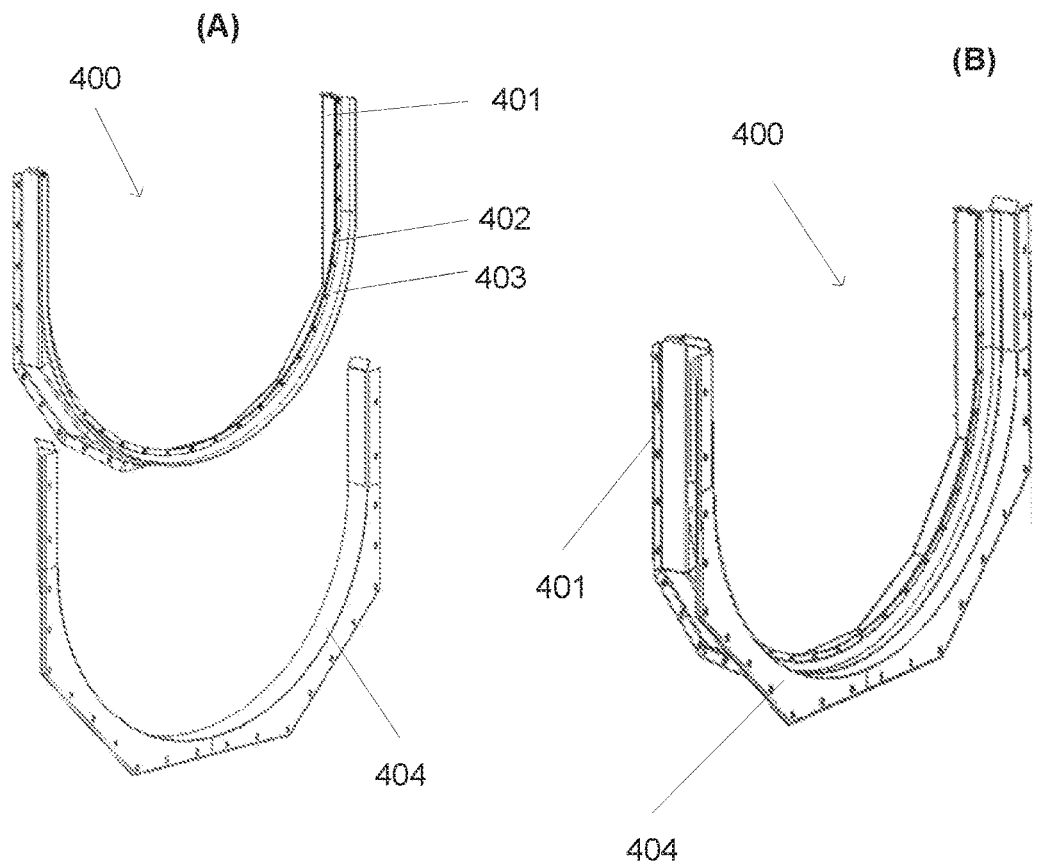
FIG. 8 is a schematic drawing of a slide connector, in raised (A) and operative (B) position.

In FIG. 8 is illustrated a slide connector 400, which may comprise a U-shaped filter side connector 401 for connection to the filter unit, a clamp bar 402 for a sealing means, for example but not limited to a rubber seal 403, and a U-shaped external connector 404. The filter side connector 401 is connected to a water inlet of the filter unit 2000 as shown in FIGS. 1 and 2, and the external connector 404 is connectable to an external source, such as another unit, a pipe, a channel or a wall with an inlet or outlet. The filter side connector 401 fits inside the external connector 404 with the rubber seal in-between forming a fluid connection between the water inlet of the filter unit and the external source when the connectors are positioned in the same height. Thereby, the filter side connector 401 of the filter system 1000 is arranged to be lifted away vertically from the external connector 404 along the lifting axis perpendicular to the mounting surface of the filter when the water filter unit 2000 is lifted from the operative position to the raised position.

With reference to FIGS. 1, 2, 3 and 8, the filter side connector 401 is shown to fit inside the external connector 404, docking into position with the rubber seal 403 in-between.

In the invention, when the filter unit is in its operational position, it is kept in its correct position. This is accomplished by the self-centering supports 300. However, a similar effect can be reached by using alternative solutions, such as holes in the floor for guiding the sleeves, a slide connector having an edge or a rail for locking the slide connector into place once lowered into operating position. Locked into position, the slide connector ensures a tight connection to the influent wall or channel due to use of the rubber seal 403 between the filter side connector 401 and external connector 404.

However, the slide connector does not prevent an upward movement along the lifting axis. As such, the filter unit may be lifted upwards without having to be unscrewed or de-installed from surrounding units. Furthermore, once the filter unit is lowered down again, it will automatically slide down into its original sealed position.

The slide connector arrangement also provides simple means for closing the water flow while the filter unit is lifted. A plate having similar dimensions as the filter side connector, thus fitting external connector 404, may be slid down between the filter unit and influent wall or channel before lifting up the filter unit, whereby the water flow will be stopped.

As such, the invention completely removes the need for divers for lifting up a filter unit semi-submerged or submerged in water.

This highlights the advantage of the slide connector 400 in the invention. Especially together with means holding the filter unit in position, such as the self-centering supports 300. This slide connector 400 will form a tight seal between the filter side connector 401 and the external connector 404, ensuring an open inlet without leaking, and still allow vertical lifting of the water filter without having to physical unmount or unscrew the filter unit from the concrete wall. This really simplifies not only the lifting of the filter unit for service or maintenance—it also removes the requirement for having to re-install the system once service is completed. Upon completion of the service, the filter unit is simply lowered down, the self-centering supports 300 in the invention will ensure that the filter unit is lowered in to the correct operating position and the slide connector 400 will once more generate a tight seal between the filter unit and the influent wall or channel, without any re-installation procedure. In practice, this might mean that a long shutdown for service is avoided, which will be beneficial, both practically and economically, in an aquaculture setting.

To lift a filter unit, the lifting pillars are simply slid down through the sleeves in the corners of the filtering device until they rest on the self-centering supports. Once the lifting pillars are in place, a lifting device, such as a hoist, may be connected to (preferably each of) the lifting pillar and sleeve. The unit may then be lifted up over the water surface, and preferably secured in uplift position using locking bolts, to ensure safe and trouble free service of the filter unit.

When the filter unit is to be lowered down, the locking bolts are removed and the filter unit is lowered down to its original position, i.e its operative position. The slide connector connects the unit to the water flow again, and once the filter unit is resting on the self-centering supports 300, the lifting aids 500 (such as hoists) and lifting pillars 100 may be safely removed.

In some embodiments, the sleeves may be integrated as part of the filter unit. However, they may also be fitted to existing filter units without sleeves.

As such, in one embodiment, the sleeves comprise filter unit connectors which enables the sleeves to be attached to the filter unit. The filter unit connectors may simply be small pieces of sheet metal attached to the sleeve, with a hole for fitting a bolt to the structure of the filter unit.

Thus, in one embodiment, as illustrated in FIGS. 1 and 2, is provided a lifting system 1000 for a water filter unit 2000, comprising at least two lifting pillars 100, and at least two sleeves 200. The sleeves 200 comprise at least two filter unit connectors 203 for attaching the sleeves 200 to the corners of the water filter 600, the length axis of the sleeves 200 being perpendicular the mounting surface of the filter 600. The lifting pillars 100 are arranged to fit inside the sleeves 200, wherein the length axis of the lifting pillars 100 coincide with the length axis of the sleeves 200. Thereby, the sleeves 200 may slide along the lifting pillars 100, forming at least two lifting pillar 100 and sleeve 200 pairs. Said at least two pairs are connected to at least one lifting aid 500, whereby the lifting system 1000 may lift a water filter unit 2000 from an operative position to a raised position.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A water filter unit with an integrated lifting system, comprising:
   a water filter, at least two lifting pillars, at least two sleeves, a slide connector, and a self-centering support for each sleeve, wherein the sleeves are attached at corners of the water filter, the length axis of the sleeves being perpendicular to the mounting surface of the water filter, the lifting pillars are arranged to fit inside the sleeves, wherein the length axis of the lifting pillars coincide with the length axis of the sleeves, such that the sleeves may slide along the lifting pillars, thereby forming at least two lifting pillar and sleeve pairs, wherein the at least two pairs are connected to at least one lifting aid for lifting the water filter unit from an operative position to a raised position, and the slide connector comprises a filter side connector connected to the water filter unit arranged for connection to an external source or outlet thereby forming a fluid connection between the water filter unit and the external source or outlet when the water filter unit is lowered into the operative position, and the self-centering support comprising a profile tube portion, and a top plate, wherein the profile tube portion fits inside the sleeve, and the lifting pillar rests on the top plate when said lifting pillar is inserted into said sleeve.

2. The water filter unit with the integrated lifting system according to claim 1, wherein the slide connector further comprises an external connector mountable on the external source.

3. The water filter unit with the integrated lifting system according to claim 2, wherein the slide connector further comprises sealing means connected to the filter side connector or the external connector, for providing a tight seal between the filter side connector or the external connector.

4. The water filter unit with the integrated lifting system according to claim 3, wherein the sealing means is a rubber seal, gasket or clamp.

5. The water filter unit with the integrated lifting system according to claim 2, wherein the external connector is U-shaped with an opening upwards along the vertical axis, such that the filter side connector fits inside the external connector and allows the filter side connector to be lifted vertically from the external source when lifting the water filter unit from the operative position to the raised position.

6. The water filter unit with the integrated lifting system according to claim 2, wherein the external source is a channel, pipe, unit, or influent wall.

7. The water filter unit with the integrated lifting system according to claim 1, the water filter unit being a rotary filter.

8. The water filter unit with the integrated lifting system according to claim 7, wherein the rotary filter is a disc filter or a drum filter.

9. The water filter unit with the integrated lifting system according to claim 1, wherein the length of the lifting pillars is at least equal to or larger than the combined length of the sleeves and the lifting capacity of the lifting system.

10. The water filter unit with the integrated lifting system according to claim 1, wherein the lifting pillars each comprises a profile tube, with a bottom end, and a top plate with anchor means for connection to the lifting aid.

11. The water filter unit with the integrated lifting system according to claim 10, wherein the sleeves each comprises a hollow profile tube provided with anchor means for connection to said lifting aid.

12. The water filter unit with the integrated lifting system according to claim 11, wherein the anchor means of the hollow profile tube and the anchor means of the lifting pillar are connected to the lifting aid on said at least two of the lifting pillar and sleeve pairs.

13. The water filter unit with the integrated lifting system according to claim 1, wherein the at least one lifting aid is selected from the group of a hoist, a winch, a rack and pinion, a lead screw, or a pneumatic or hydraulic cylinder.

14. The water filter unit with the integrated lifting system according to claim 1, wherein the self-centering support further comprises a base plate, and a vertical centering tap located on the top plate, wherein the vertical centering tap fits inside the lifting pillar, such that the pillar is centered on the self-centering support when said lifting pillar is inserted into said sleeve.

15. The water filter unit with the integrated lifting system according to claim 1, wherein the slide connector, comprises a U-shaped filter side connector for connection to the filter unit, a sealing means, and a U-shaped external connector, wherein the filter side connector is connected to a water inlet or outlet of the filter unit, and the external connector is connectable to an external source, and the filter side connector fits inside the external connector with the sealing means in-between forming a fluid connection between the filter unit and the external source when the filter unit is in operative position, and wherein the filter side connector is arranged to be lifted away vertically from the external connector along the lifting axis perpendicular to the mounting surface of the filter when the water filter unit is lifted from the operative position to the raised position.

16. The water filter unit with the integrated lifting system according to claim 1, wherein the profile tube of the lifting pillars and a hollow profile tube of the sleeves comprise locking holes, wherein the locking holes overlap once the water filter unit is in the raised position, such that locking bolts may be inserted through the locking holes to secure the sleeves to the lifting pillars.

17. A lifting system for a water filter unit, comprising at least two lifting pillars, at least two sleeves, a slide connector, and a self-centering support for each sleeve, wherein the sleeves comprises at least two filter unit connectors for attaching the sleeves to the corners of a water filter, the length axis of the sleeves being perpendicular the mounting surface of the filter, and the lifting pillars are arranged to fit inside the sleeves, wherein the length axis of the lifting pillars coincide with the length axis of the sleeves, such that the sleeves may slide along the lifting pillars, thereby forming at least two lifting pillar and sleeve pairs, wherein the at least two pairs are connected to at least one lifting aid, whereby the lifting system may lift a water filter unit from an operative position to a raised position, and the slide connector of the water filter unit comprises a filter side connector for connection to the water filter unit arranged for connection to an external source or outlet thereby forming a fluid connection between the water filter unit and the external source or outlet when the water filter unit is lowered into the operative position, and the self-centering support comprises a profile tube portion, and a top plate, wherein the profile tube portion fits inside the sleeve, and the lifting pillar rests on the top plate when said lifting pillar is inserted into said sleeve.

18. The lifting system for the water filter unit according to claim 17, wherein the slide connector further comprises an external connector mountable on the external source.

19. The lifting system for the water filter unit according to claim 18, wherein the slide connector further comprises sealing means connected to the filter side connector or the external connector, for providing a tight seal between the filter side connector and the external connector.

20. The lifting system for the water filter unit according to claim 19, wherein the sealing means is a rubber seal, gasket or clamp.

21. The lifting system for the water filter unit according to claim 18, wherein the external connector is U-shaped with an opening upwards along the vertical axis, such that the filter side connector fits inside the external connector and allows the filter side connector to be lifted vertically from the external source when lifting the water filter unit from the operative position to a raised position.

22. The lifting system for the water filter unit according to claim 18, wherein the external source is a channel, pipe, unit, or influent wall.

23. The lifting system for the water filter unit according to claim 17, the filter unit being a rotary filter.

24. The lifting system for the water filter unit according to claim 23, wherein the rotary filter is a disc filter or a drum filter.

25. The lifting system for the water filter unit according to claim 17, wherein the length of the lifting pillars is at least equal to or larger than the combined length of the sleeves and the lifting capacity of the lifting system.

26. The lifting system for the water filter unit according to claim 17, wherein the lifting pillars each comprises a profile tube, with a bottom end, and a top plate with anchor means for connection to the lifting aid.

27. The lifting system for the water filter unit according to claim 17, wherein the sleeves each comprises a hollow profile tube provided with anchor means for connection to said lifting aid.

28. The lifting system for the water filter unit according to claim 27, wherein the anchor means of the hollow profile tube and the anchor means of the lifting pillar are connected to the lifting aid on said at least two of the lifting pillar and sleeve pairs.

29. The lifting system for the water filter unit according to claim 17, wherein the at least one lifting aid is selected from the group of a hoist, a winch, a rack and pinion, a lead screw, or a pneumatic or hydraulic cylinder.

30. The lifting system for the water filter unit according to claim 17, wherein the self-centering support further comprises a base plate, and a vertical centering tap located on the top plate, wherein the vertical centering tap fits inside the lifting pillar, such that the pillar is centered on the self-centering support when said lifting pillar is inserted into said sleeve.

31. The lifting system for the water filter unit according to claim 17, wherein the slide connector comprises a U-shaped filter side connector for connection to a filter unit, a sealing means, and a U-shaped external connector, wherein the filter side connector is to be connected to a water inlet or outlet of a water filter unit, and the external connector is connectable to an external source, and the filter side connector fits inside the external connector with the sealing means in-between forming a fluid connection between a filter unit and an external source when the filter unit is in operative position, and wherein the filter side connector is arranged to be lifted away vertically from the external connector along the lifting axis perpendicular to the mounting surface of the filter when a water filter unit is lifted from the operative position to the raised position.

32. The lifting system for the water filter unit according to claim 17, wherein the profile tube portion and a hollow profile tube of the sleeves comprise locking holes, wherein the locking holes overlap once the filter unit is in the raised position, such that locking bolts may be inserted through the locking holes to secure the sleeves to the lifting pillars.

\* \* \* \* \*